United States Patent
Kim et al.

(10) Patent No.: US 9,519,537 B2
(45) Date of Patent: Dec. 13, 2016

(54) APPARATUS, SYSTEM AND METHOD FOR APPLICATION LOG DATA PROCESSING

(71) Applicant: LSIS CO., LTD., Anyang-si, Gyeonggi-do (KR)

(72) Inventors: Tae Ho Kim, Anyang-si (KR); Yong Ik Lee, Hwaseong-si (KR); Jong Ho Park, Gwangmyeong-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/682,003

(22) Filed: Apr. 8, 2015

(65) Prior Publication Data

US 2015/0293801 A1 Oct. 15, 2015

(30) Foreign Application Priority Data

Apr. 15, 2014 (KR) .................. 10-2014-0044853

(51) Int. Cl.
  *G06F 11/00* (2006.01)
  *G06F 11/07* (2006.01)
  *G06F 11/34* (2006.01)
  *G06F 11/30* (2006.01)

(52) U.S. Cl.
  CPC ......... *G06F 11/079* (2013.01); *G06F 11/0778* (2013.01); *G06F 11/3476* (2013.01); *G06F 11/3065* (2013.01); *G06F 11/3082* (2013.01)

(58) Field of Classification Search
  USPC ........................................ 714/37
  See application file for complete search history.

(56) References Cited

U.S. PATENT DOCUMENTS

2010/0023545 A1* 1/2010 Gladkov ............... G06F 11/323 707/E17.005
2010/0211826 A1 8/2010 Villella et al.
2013/0198272 A1 8/2013 Shionoya et al.

FOREIGN PATENT DOCUMENTS

| EP | 1577783 | 9/2005 |
| JP | 2004-240498 | 8/2004 |
| JP | 2007-200183 | 8/2007 |
| JP | 2009-048359 | 3/2009 |
| KR | 10-2012-0100146 | 9/2012 |

OTHER PUBLICATIONS

European Patent Office Application Serial No. 15162883.1, Search Report dated Sep. 15, 2015, 7 pages.

* cited by examiner

*Primary Examiner* — Sarai Butler
(74) *Attorney, Agent, or Firm* — Lee, Hong, Degerman, Kang & Waimey

(57) ABSTRACT

The present disclosure relates to a log data processing apparatus and a method for controlling the same. A log data processing apparatus according to an embodiment includes a communication unit configured to receive information on log data corresponding to an application from a device for generating the log data, a control unit configured to generate a log message on a basis of the log data information, and a storage unit configured to store the log message and generation history information of the log message generated, wherein the log data information includes a log message parameter, message code information, and identifier information of the application.

5 Claims, 3 Drawing Sheets

APPARATUS, SYSTEM AND METHOD FOR APPLICATION LOG DATA PROCESSING

CROSS-REFERENCE TO RELATED APPLICATIONS

Pursuant to 35 U.S.C. §119(a), this application claims the benefit of earlier filing date and right of priority of Korean Patent Application No. 10-2014-0044853 filed on Apr. 15, 2014, the contents of which are all hereby incorporated by reference herein in its entirety.

BACKGROUND

The present disclosure relates to an apparatus, system and method for processing application log data.

In general, in the case of a single application, an operation state of a device which occurs while a program is run is stored as a text-type log file, so that problems are checked by analyzing the log file when the device is operated or inspected.

However, in the case of a system including a plurality of applications, such as a supervisory control and data acquisition (SCADA) system or an energy management system (EMS), it is difficult to analyze the log file of each application since the number and types of the applications are large.

FIG. 1 is an exemplary diagram illustrating a format of a log file generated by a conventional application.

As illustrated in FIG. 1, log data is generated so as to correspond to executed applications, with respect to applications that are driven in a system (11, 12). Therefore, in the case where the system is complicated or the number of executed applications is large, the number of log files corresponding thereto increases.

Furthermore, in the case of a multithread application, a synchronizing processing function should be provided for file processing so that a single log file is simultaneously logged in by multiple threads. Therefore, it consumes a large amount of time and cost for each developer to develop a log file analyzing tool in addition to an application that is a main element to be developed.

SUMMARY

Embodiments provide an apparatus, system and method for processing application log data to easily analyze a log file generated due to execution of an application and reduce a time and human resources for the analysis.

In one embodiment, a log data processing apparatus includes a communication unit configured to receive information on log data corresponding to an application from a device for generating the log data, a control unit configured to generate a log message on a basis of the log data information, and a storage unit configured to store the log message and generation history information of the log message generated, wherein the log data information comprises a log message parameter, message code information, and identifier information of the application.

The log message may include a level character string and a message character string on the basis of the log data information.

The control unit may generate a level character string and level information of the log data on a basis of the message code information.

The storage unit may include a history storage unit configured to store the generation history information of the log message, and a data storage unit configured to store the log message generated.

The log data processing apparatus may further include a log viewer configured to output the log message on the basis of the log data information.

According to the apparatus and method for processing application log data according to the embodiment, in order to collect and analyze a large amount of log data generated due to execution of programs, a server for managing and processing the log data is provided to process the collected log data with minimal communication load, time and cost.

The details of one or more embodiments are set forth in the accompanying drawings and the description below. Other features will be apparent from the description and drawings, and from the claims.

DETAILED DESCRIPTION OF THE EMBODIMENTS

Figure 1:
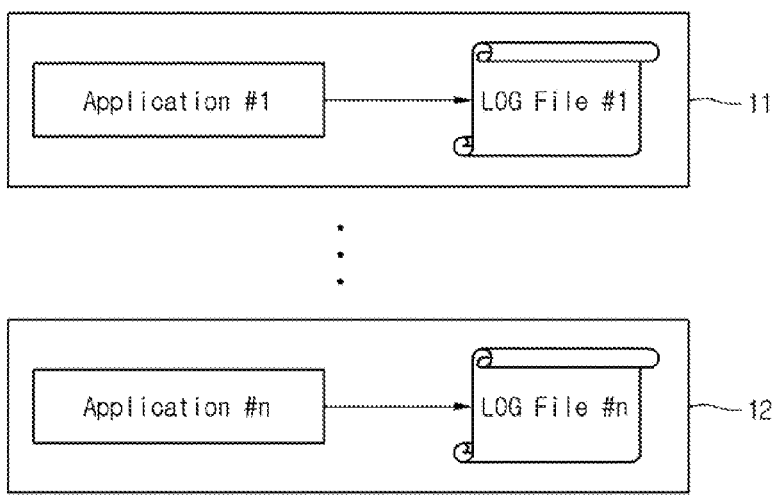
FIG. 1 is an exemplary diagram illustrating a format of a log file generated by a conventional application.

Reference will now be made in detail to the embodiments of the present disclosure, examples of which are illustrated in the accompanying drawings.

An electric device for an electric vehicle according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

In the descriptions of embodiments, it will be understood that when a layer (or film), a region, a pattern, or a structure is referred to as being 'on/above/over/upper' board or 'under/below/lower', the 'on/above/over/upper' board and 'under/below/lower' comprise each layer (or film), a region, a pad, or patterns, which can be directly formed on board as well as each layer (or film), the region, the pad, or the patterns, which can be indirectly formed under another layer (film), another region, another pad, or another patterns, with one or more intervening layers may also being present. Therefore, meaning thereof should be judged according to the spirit of the present disclosure.

Thickness or size of each layer in the drawings has been exaggerated, omitted, or roughly illustrated for the convenience and clarity of the description. Further, sizes of the respective components do not entirely reflect actual sizes thereof.

Hereinafter, an embodiment will be described in detail with reference to the accompanying drawings.

Figure 2:
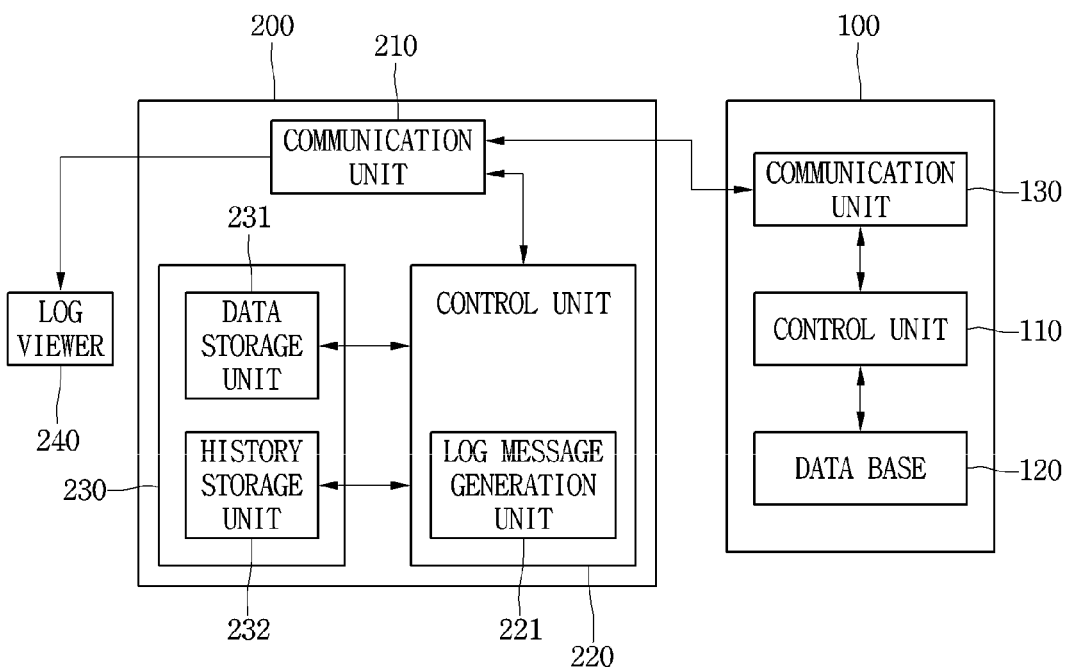
FIG. 2 is a block diagram illustrating a log data processing system according to an embodiment.

FIG. 2 is a block diagram illustrating a log data processing system according to an embodiment.

In the embodiment, a device for generating log data corresponding to an executed application is provided.

Although there may be various types of the device for generating log data, a supervisory control device is exemplarily employed as the device for generating log data herein. That is, various devices or systems for generating log data other than the supervisory control device may be applied to the embodiment.

Referring to FIG. 2, the log data processing system according to the embodiment includes a supervisory control device 100 and a log data processing server 200.

The supervisory control device 100 may include a control unit 110, a database 120, and a communication unit 130.

The control unit 110 may execute an application in the supervisory control device 100, and may generate log data corresponding to the application executed. The control unit 110 may control the generated log data so that the log data is stored in the database 120 in association with respective applications. The control unit 110 may extract queue information for storing the generated log data in the log data processing server 200, message code information, and a log message parameter to be contained in a log message. The queue information of the log data may be location information of a queue for storing log data information received from the supervisory control device 100. The message code information may include a combination of a character and a number. For example, the message code information may include A to Z sections, wherein each section may define messages of from 1 to 999 (e.g., A0001-A999). That is, the message code information may define a message format and level information of the log data. The log message parameter may define contents contained in a log message to be generated in the log data processing server 200. The generated log data information may be transmitted to the log data processing server via the communication unit 130.

The database 120 may store the log data generated so as to correspond to an application executed on the basis of control by the control unit 110. Furthermore, the database 120 may store information for storing the log data in the log data processing server 200 in order to transmit the log data to the log data processing server 200. Therefore, the database 120 may output storage information for the log data to be transmitted to the log data processing server 200 on the basis of control by the control unit 110.

The communication unit 130 may transmit the log data generated according to execution of an application to the log data processing server 200 on the basis of control by the control unit 110 according to the embodiment. Furthermore, the communication unit 130 may receive information on the log data stored in the log data processing server 200 from the log data processing server 200.

The log data processing server 200 may receive the log data information generated according to execution of an application obtained from the supervisory control device 100. The log data processing server 200 may generate and store a log data message on the basis of the log data information received from the supervisory control device 100. The log data processing server 200 according to the embodiment may include a communication unit 210, a control unit 220, and a storage unit 230.

The communication unit 210 may receive information on the log data received from the supervisory control device 100, and may transmit storage information on the received log data to a log viewer 240 or the supervisory control device 100.

The control unit 220 may generate the log message on the basis of the information on the log data received from the supervisory control device 100. The control unit 220 according to the embodiment may include a log message generation unit 221.

The log message generation unit 221 according to the embodiment may receive the log data information including the log message parameter, the message code and the queue information of the log data received from the supervisory control device 100. The log message generation unit 221 may analyze the received log data information to generate the log message including a message corresponding to the message code. The control unit 220 may store the generated log message in the storage unit 230.

The storage unit 230 may store log message generation history information and the log message generated by the control unit 220 on the basis of the log data information received from the supervisory control device 100.

The storage unit 230 according to the embodiment may include a data storage unit 231 and a history storage unit 232.

The log viewer 240 may be connected to the log data processing server 200, and may extract and display only the log message corresponding to the queue information. The log viewer 240 may be an output device for outputting the log message, or may be an external terminal device connected by external communication.

A log data processing operation based on the above-mentioned system according to the embodiment will be described in detail with reference to FIGS. 3 to 5.

Figure 3:
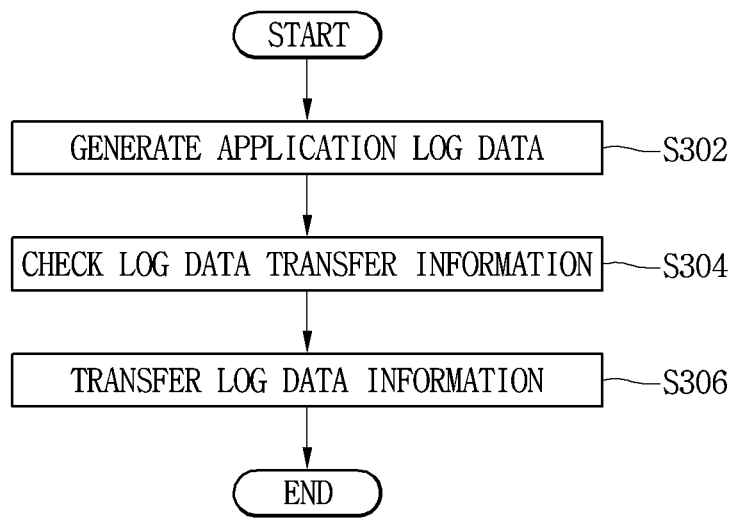
FIG. 3 is a flowchart illustrating log data generation and transmitting operations in a supervisory control device according to the embodiment.

FIG. 3 is a flowchart illustrating log data generation and transmitting operations in the supervisory control device according to the embodiment.

Referring to FIG. 3, the control unit 110 of the supervisory control device 100 according to the embodiment may generate the log data according to an application (S302).

The control unit 110 may check (extract) the log data information for transmitting the generated log data to the log data processing server 200 (S304).

Then, the control unit 110 may allow the log data information to be transmitted (S306).

Figure 5:
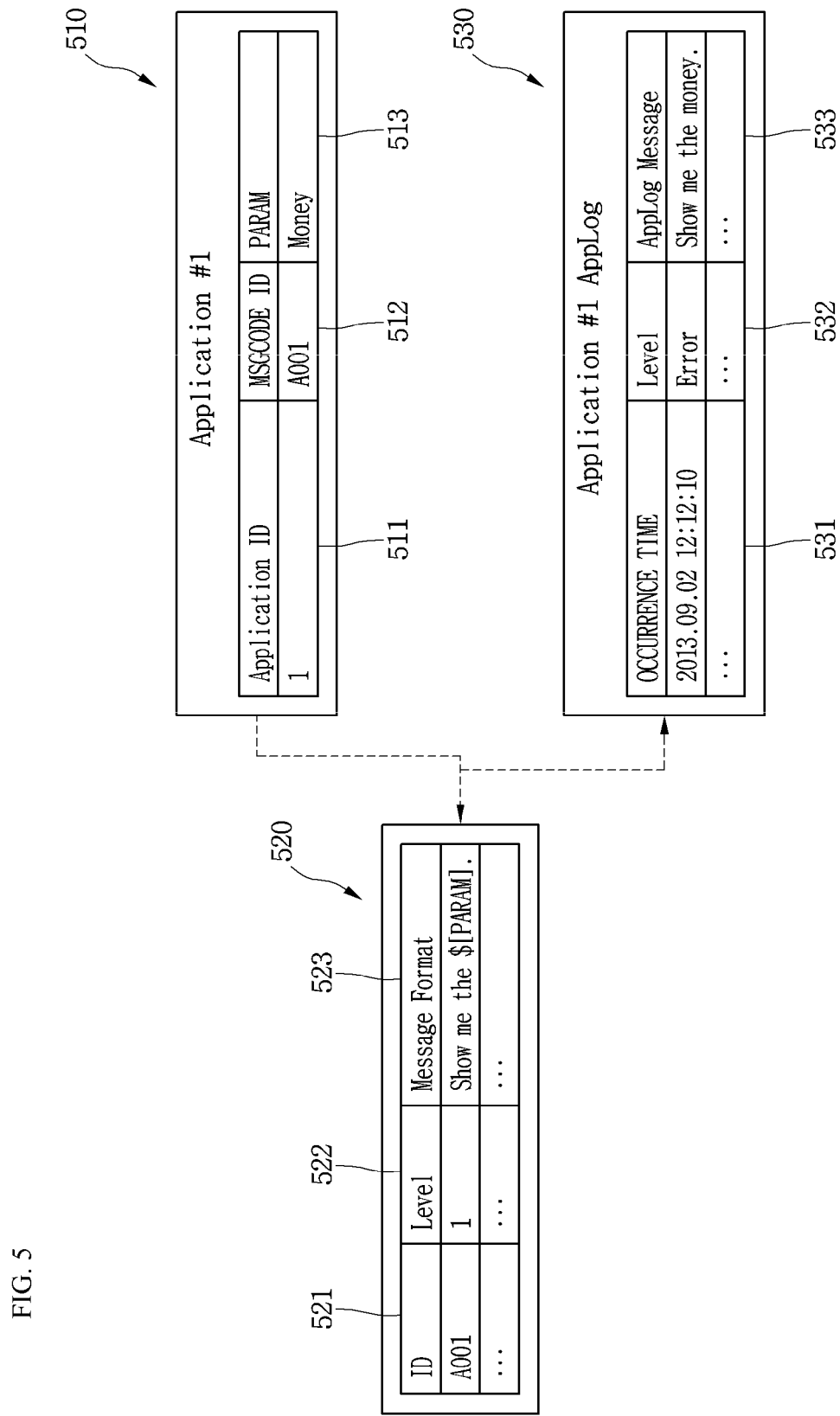
FIG. 5 is an exemplary diagram illustrating a format of log data processed according to the embodiment.

FIG. 5 is an exemplary diagram illustrating the format of the log data processed according to the embodiment.

Referring to FIG. 5, the control unit 100 of the supervisory control device 100 may generate the log data for an application in the format indicated by reference numeral 510. As described above with reference to FIG. 2, log data 510 may include application identifier information 511, message code information 512, and a log message parameter 513. In the embodiment, it is assumed that the application identifier is "1", the message code information is "A0001" defining 0001 of section A, and the log message parameter is "Money".

The control unit 110 transfers, to the log data processing server 200, the log data information including the log message parameter 513 (Money), the message code information 512 (A0001), and the application identifier information 511 (1) extracted to be transmitted to the log data processing server 200 (S306).

A log data processing operation of the log data processing server 200 will be described in detail with reference to FIG. 4, on the basis of the log data information transmitted from the supervisory control device 100 to the log data processing server 200.

Figure 4:
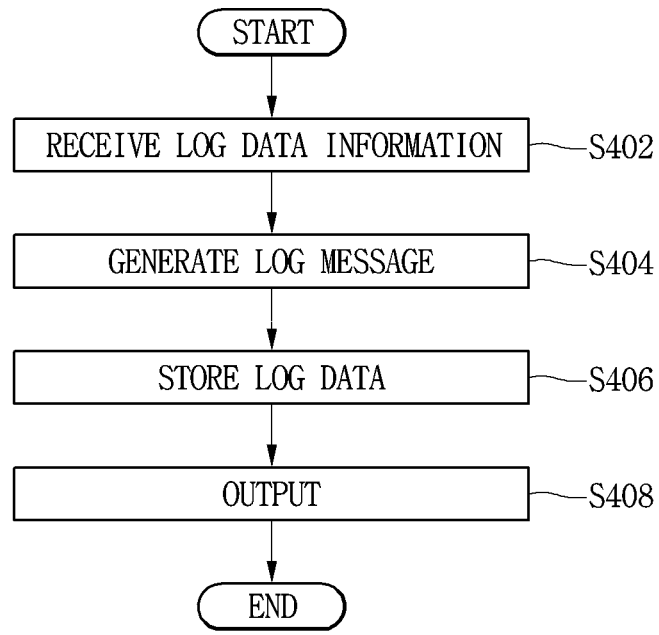
FIG. 4 is a flowchart illustrating operation of a log data processing server according to the embodiment.

FIG. 4 is a flowchart illustrating operation of the log data processing server according to the embodiment.

Referring to FIG. 4, the control unit 220 of the log data processing server 200 according to the embodiment may receive the log data information from the supervisory control device 100 (S402).

The control unit 220 may generate the log message on the basis of the log data information received from the supervisory control device 100 (S404).

The generated log message may include message code information of the log data, a level of the log data, and a message format including a log message parameter, as indicated by reference numeral 520 of FIG. 5.

That is, on the basis of the log data information received from the supervisory control device 100, the control unit 220 may check message code information 521 (A0001) to discover level information from the database in order to generate a level character string 522. Furthermore, by replacing the log message parameter 513 (Money) with a message-type parameter value, a message character string 523 may be generated.

The control unit 220 may combine the level character string 522 with the message character string 523 to generate the log message corresponding to an application, wherein the generated log message may be inserted into a corresponding queue and a history file corresponding to application information so as to be stored in the storage unit 230 (S406).

The control unit 220 may output the generated and stored log message through the log viewer 250, as indicated by reference numeral 530 of FIG. 5. The log message output through the log viewer 250 may include a generation time 531 of the log data corresponding to an application, a level 532 of the log data, and a log message 533.

As described above, according to the apparatus and method for processing application log data according to the embodiment, in order to collect and analyze a large amount of log data generated due to execution of programs, a server for managing and processing the log data is provided to process the collected log data with minimal communication load, time and cost.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A log data processing system comprising:
   a log data generation device configured to execute an application and generate log data corresponding to the executed application; and
   a log data processing server configured to generate and store a log data message based on the generated log data, the log data processing server comprising:
   a communication unit configured to receive log data information related to the generated log data from the log data generation device;
   a control unit comprising a log message generation unit configured to generate a log message based on the received log data information; and
   a storage unit configured to store the generated log message and generation history information of the generated log message,
   wherein the log data information comprises a log message parameter, message code information, and identifier information of the executed application, and
   wherein the log message generation unit generates a level character string and level information of the log data based on the message code information.

2. The log data processing system according to claim 1, wherein the generated log message comprises the generated level character string and the generated message character string based on the received log data information.

3. The log data processing system according to claim 1, wherein the storage unit comprises:
   a history storage unit configured to store the generation history information; and
   a data storage unit configured to store the generated log message.

4. The log data processing system according to claim 1, further comprising a log viewer configured to output the generated log message based on the received log data information.

5. The log data processing system according to claim 1, wherein the log data generation device is a supervisory control device.

* * * * *